United States Patent [19]

Chang

[11] Patent Number: 4,946,187
[45] Date of Patent: Aug. 7, 1990

[54] PORTABLE CARRIER

[76] Inventor: I. Shan Chang, 184, Pu Tse Pu, Wanchao Tsun, Chu Chee Hsiang, Chia-Yi Hsien, Taiwan

[21] Appl. No.: 444,003

[22] Filed: Nov. 30, 1989

[51] Int. Cl.$^5$ ................................................ B62B 1/00
[52] U.S. Cl. .................................... 280/652; 280/654; 280/47.24
[58] Field of Search ................. 280/638, 35, 639, 651, 280/652, 654, 655, 655.1, 47.131, 47.24

[56] References Cited

U.S. PATENT DOCUMENTS

| | | | |
|---|---|---|---|
| 4,040,642 | 8/1977 | David | 280/654 |
| 4,121,855 | 10/1978 | Mortenson | 280/654 |
| 4,175,769 | 11/1979 | Kazmark | 280/654 |
| 4,275,894 | 6/1981 | Mortenson | 280/654 |
| 4,458,914 | 7/1984 | Holtz | 280/654 |

Primary Examiner—Charles A. Marmor
Assistant Examiner—Richard Camby
Attorney, Agent, or Firm—Ronald W. Hind

[57] ABSTRACT

A portable carrier comprises frames such as a handle frame defined by a handlebar and a pair of parallel handlebar tubes, and a luggage frame defined by a front tube and a pair of parallel side-tubes; where the frames are connected by a pivoting mechanism and snapped together by a fastening mechanism, so that the luggage frame can be readily unfolded from, or folded to, the handle frame. Both the tails of the two parallel side-tubes of the luggage frame are folded into a U-shape, and then a beam is fixed on each of the U-shaped tails. A supporting rod is fixed on and between the beams. Each of the handlebar tubes, at the lower end, are pivotally connected on the supporting rod. An axle is fitted to the U-shaped tails at a spot near the center of the tails. The axle protrudes from each of the tails so as to rotationally mount a wheel respectively, while the axle and the tails are fitted statically with no relative motion there-between. Two inverted L-shaped fastening rods in each of its two ends are fixed onto the end of the U-shaped tail and at an appropriate spot on the axle. A fork is fixed on the top of the left-sided fastening rod, where the span of the fork is slightly smaller than the outside diameter of the left-sided handlebar tube, and both ends of the fork are offset so as to snap to the left-sided fastening rod without difficulty for the positioning of the luggage to an unfolded status in the event the luggage frame swings out. The top of the right-sided fastening rod is formed as a fastening portion, thereby the hook of a depending rod is attached on the right-sided handlebar tube and is stopped so that a folded status of the carrier can be maintained. Folding and unfolding of the portable carrier can be effectuated by the user while in an upright posture with the simple manipulation of his (or her) hands and feet.

1 Claim, 3 Drawing Sheets

PORTABLE CARRIER

FIELD OF THE INVENTION

The invention relates to a portable carrier, in particular to a carrier which the user can, in an upright posture, readily fold or unfold the luggage frame. The commonly-known type of portable carrier is the one in which its luggage frame is fixed to the handle frame so that unfolding the luggage frame is impossible. For this particular type of carrier, the luggage frame cannot be too large, otherwise it would be inconvenient to carry. In addition, another type of the carrier is designed to have the luggage frame be foldable; however, since the user is forced to stoop to fold or unfold the luggage frame, it is inconvenient as well.

To solve the problems mentioned above, the present invention provides a portable carrier of which the luggage frame can readily be folded to, or unfolded from, the handle frame even if the user is in an upright posture.

This accomplishment not only makes it possible to have a larger luggage frame, but also allows convenient folding or unfolding of the luggage frame since no stooping is necessary for the user.

SUMMARY OF THE INVENTION

Accordingly, the primary objective of the present invention is to provide a portable carrier which the user can readily fold or unfold the luggage frame even if he maintains an upright posture.

It is understood that, in reference to the pivoting mechanism provided on the tails of the luggage frame and the lower part of the handle frame, the luggage frame can be pivotally folded or unfolded without stooping over to do so. In addition, by means of the fastening rods provided on the axle, and the hook mechanism on the handlebar tube, the luggage frame can be easily set into position after the folding or unfolding thereof.

DETAILED DESCRIPTION OF THE INVENTION

Description for a Preferred Embodiment

Simple Description of the Drawings

Figure 1:
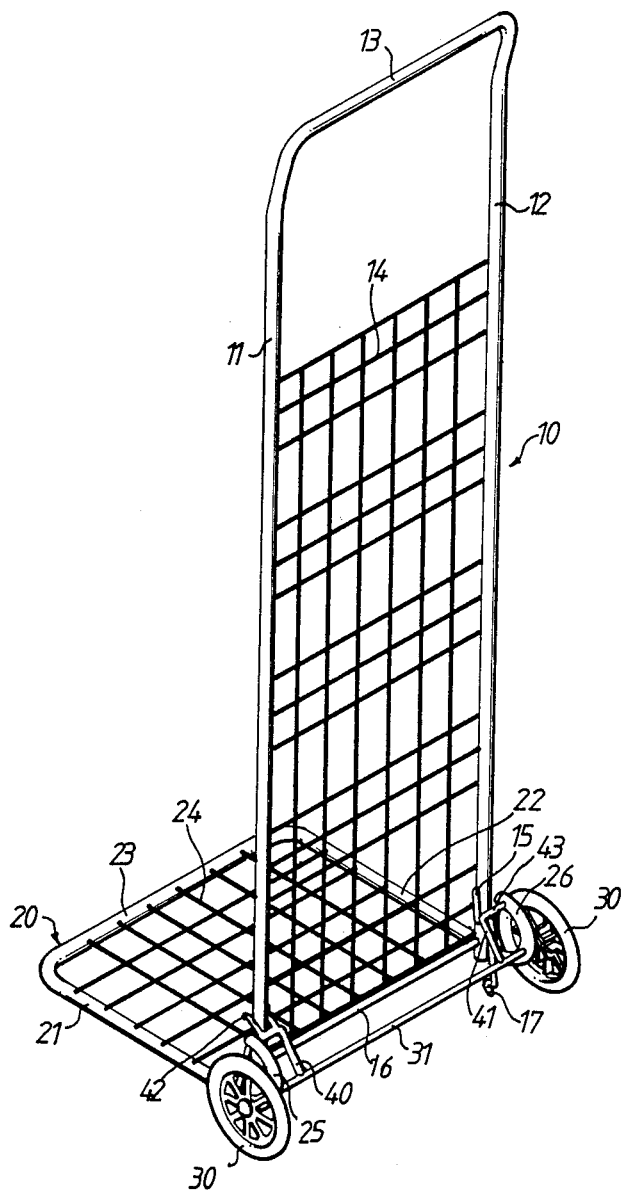
FIG. 1 is a perspective view of the present invention showing that the luggage frame has been unfolded from the handle frame.
Figure 2:
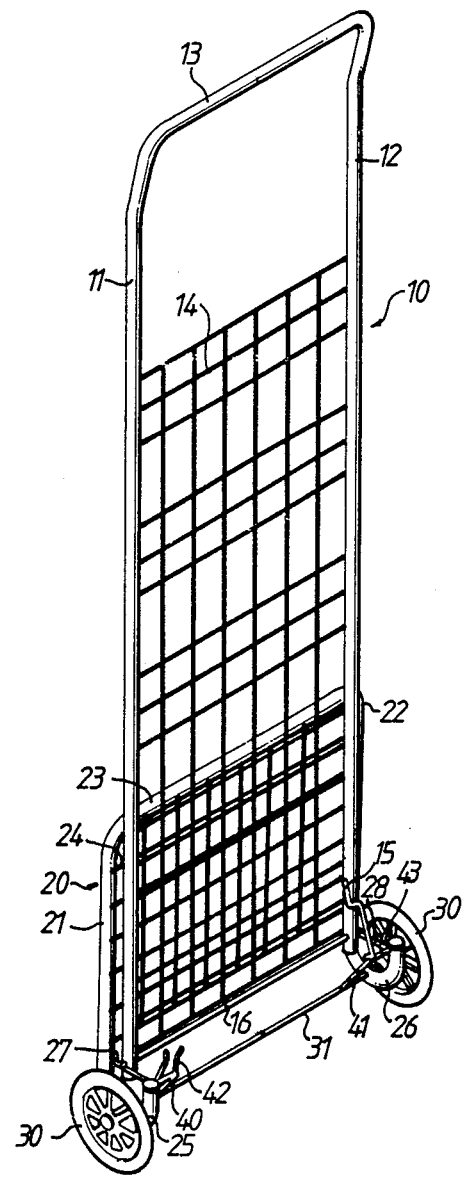
FIG. 2 is a perspective view of the present invention showing that the luggage frame has been folded to the handle frame.

As shown in FIGS. 1 and 2, the present invention comprises frames such as a handle frame 10 and a luggage frame 20; where the handle frame 10 is defined by a handlebar 13 and a pair of parallel handlebar tubes 11 and 12, and the luggage frame 20 is defined by a front tube 23 and a pair of parallel side-tubes 21 and 22. The frames 10 and 20 are connected by a pivoting mechanism and are snapped together by a fastening mechanism. The aft ends of the side-tubes 21 and 22 are bent to form the U-tails 25 and 26. Wires are longitudinally and latitudinally fixed or welded on and between the front tube 23 and the side-tubes 21 and 22 to form a net 24. Likewise, wires are longitudinally and latitudinally fixed or welded on and between the handlebar tubes 11 and 12 to form a net 14.

Figure 3:
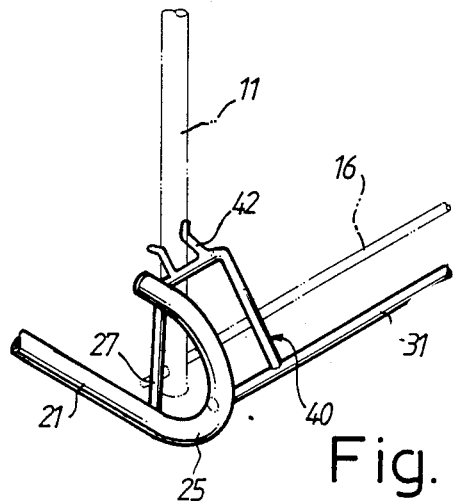
FIG. 3 is a perspective view showing that the fork of the left-sided fastening rod is receiving the handlebar tube when the luggage frame is unfolded.
Figure 4:
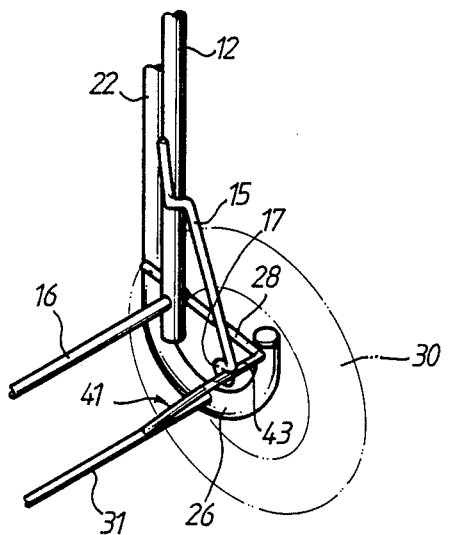
FIG. 4 is a perspective view showing that the fastening portion of the right-sided fastening rod is pressing against the hook rod.

Now refer to FIGS. 3 and 4, in which each of the U-tails 25 and 26 are welded with a beam 27 or 28. A supporting rod 16 is welded on and between the beams 27 and 28 at a spot near one end of the beams 27 and 28, as clearly shown in FIG. 3. The lower ends of the parallel handlebar tubes 11 and 12 are rotationally connected with the supporting rod 16.

An axle 31 is fitted to the U-tails 25 and 26 at a spot near the center of the U-tails in such a manner that each end of the axle 31 goes through the U-tail 25 or 26 for a short distance and rotationally mounts a wheel 30, while the axle 31 is welded with the U-tails 25 and 26 so that no relative motion occurs between them.

Each of the fastening rods 40 and 41 have an inverted-L shape and is at one end welded to the end of the U-tails 25 and 26; and at the other, is welded at an appropriate spot on the axle 31. A U-shaped fork 42 is welded to the top of the left-sided fastening rod, where the span of fork 42 is slightly smaller than the outside diameter of the left-sided handlebar 11, and both ends of the fork 42 are offset so as to snap to the left-sided fastening rod 40 without difficulty so as to position the carrier in an unfolded status in case the luggage frame 20 is to swing out. The top of the right-sided fastening rod 41 is formed as a fastening portion 43, thereby the hook 17 of the depending rod 15 is welded on the right-sided handlebar tube 12, and is stopped so that a folded status of the carrier can be maintained. This is so because the luggage frame 20 has a tendency to swing out in a counterclockwise direction, as does the fastening portion 43, and the station hook 17 stops the fastening portion 43, so that the luggage frame 20 cannot swing out, thus maintaining the luggage frame in a folded status.

The manner of operation of the present invention is described as follows:

When the luggage frame 20 is in an unfolded position as shown in FIG. 1 and intended to be folded, the user should first step on the axle 31, then push the handlebar 13 slightly forward so as to disengage the left-sided handlebar tube 11 from fork 42. The handlebar 13 is thereafter lifted up, together with the handlebar tubes 11 and 12, and the supporting rod 16, so that the luggage frame 20 pivots about the axle 31 and abuts on the handle frame 10. Likewise, there is a pivoting action which occurs between the handlebar tubes 11 and 12, and the supporting rod 16, when the luggage frame 20 is swinging toward the handle frame 10. When the luggage frame 20 is folded and abutting on the handle frame 10, the U-tails 25 and 26 are in an upward position as shown in FIG. 4. Meanwhile, the juncture of the supporting rod 16 and the beams 27 and 28 will rotate about the axle 31 from a lower position to a higher one. That is to say, the lower portion of the handlebar tubes 11 and 12 will move upward and so will hook 17 of the rod 15. As a result, hook 17 meets the fastening portion 43 of the fastening rod 41, and hook 17 stops the fastening portion 43 so that the hook portion 43 cannot rotate counterclockwise which makes the luggage frame 20 maintain a folded status.

When the luggage frame 20 is to be unfolded by the user, the handlebar 13 should be pushed slightly forward, then the rightfoot of the user must step on the rod 15 to disengage the hook 17 from the fastening portion 43 of the fastening rod 41, so that the luggage frame 20 will pivot around the axle 31 counterclockwise by itself, due to the inertia of its weight. Thereafter, when the handlebar 13 is slightly moved backward, the left-sided handlebar tube 11 will snap into the fork 42 of the fastening rod 40 so as to position the luggage frame 20 in an unfolded status. Since the luggage frame 20 and the handle frame 10 bear no force to allow them to collapse together, this fork 42 shall be sufficient to maintain the luggage frame 20 in an unfolded position.

In view of the above, it is undeniable that the present invention is a portable carrier which is extremely easy to manipulate and that it provides a unique means of transportation for one who although maintaining an upright posture, can easily fold or unfold the luggage frame. In particular, the pivoting and fastening mechanisms described in the present invention are the key features of the invention. Any modification or changes to the configuration or joining location of the pivoting or fastening mechanism, without departing from the spirit of the invention, should still be considered within the scope of the invention. The scope of the invention is defined by the following claim.

I claim:

1. A portable carrier, including:

a handle frame, having a pair of parallel handlebar tubes, wherein the lower part of the right-side handlebar tube is equipped with a hook rod;

a luggage frame, having a pair of parallel side-tubes, wherein the tail of each side-tube is formed in a U-shape and a beam is fixed on each of the U-shaped tails respectively;

a supporting rod is fixed on and between the beams to which the lower part of the handlebar tubes are pivotally connected;

an axle, each end going through the U-shaped tail rotationally mounting a wheel, and the axle and the U-shaped tails are statically fitted without relative motion to each other;

a fork mechanism, disposed on the left-side U-shaped tail and the left side of the supporting rod, wherein the size of the fork mechanism complies with the diameter of the left-sided handlebar tube, so that the fork mechanism may snap to the left-sided handlebar tube; and a fastening mechanism, disposed on the right-sided U-shaped tail and the right side of the supporting rod, wherein the fastening mechanism complies with the hook rod provided at the lower part of the right-sided handlebar tube, so that in case the fastening mechanism encounters the hook rod when the luggage frame is folded, the fastening mechansim will be restrained from further rotation.

* * * * *